United States Patent
Yang

(10) Patent No.: US 9,417,508 B2
(45) Date of Patent: Aug. 16, 2016

(54) INVERSELY FOLDABLE CAMERA TRIPOD BEING RAPIDLY ASSEMBLED

(76) Inventor: Yongjian Yang, Hong Kong (CN)

( * ) Notice: Subject to any disclaimer, the term of this patent is extended or adjusted under 35 U.S.C. 154(b) by 0 days.

(21) Appl. No.: 14/394,289

(22) PCT Filed: Jul. 23, 2012

(86) PCT No.: PCT/CN2012/079027
§ 371 (c)(1),
(2), (4) Date: Oct. 14, 2014

(87) PCT Pub. No.: WO2013/155806
PCT Pub. Date: Oct. 24, 2013

(65) Prior Publication Data
US 2015/0076296 A1 Mar. 19, 2015

(30) Foreign Application Priority Data
Apr. 16, 2012 (CN) .......................... 2012 1 0111928

(51) Int. Cl.
G03B 17/56 (2006.01)
F16M 11/04 (2006.01)
(Continued)

(52) U.S. Cl.
CPC ........... *G03B 17/561* (2013.01); *F16M 11/041* (2013.01); *F16M 11/08* (2013.01);
(Continued)

(58) Field of Classification Search
CPC ..... F16M 11/00; F16M 11/02; F16M 11/041; F16M 11/14; F16M 11/38; F16M 11/32; F16M 11/26; F16M 11/16; F16B 7/105; G03B 17/561
USPC .............. 248/168, 166, 188, 165, 169, 188.1, 248/188.2, 188.6, 188.8, 188.9, 176.1, 248/177.1, 178.1, 187.1, 183.2
See application file for complete search history.

(56) References Cited

U.S. PATENT DOCUMENTS 2,231,783 A * 2/1941 Tresslar et al. ............ 248/177.1
3,123,330 A * 3/1964 Forbes-Robinson ....... 248/183.2
(Continued)

FOREIGN PATENT DOCUMENTS

CN 2467862 Y 12/2001
CN 101561618 A 10/2009
(Continued)

OTHER PUBLICATIONS

International Search Report; PCT/CN2012/079027; International Filing Date: Jul. 23, 2012; 3 pgs.

*Primary Examiner* — Nkeisha Smith
(74) *Attorney, Agent, or Firm* — Schmeiser, Olsen & Watts, LLP

(57) ABSTRACT

An inversely foldable camera tripod being rapidly assembled, comprising legs assemblies being rapidly assembled and being refracted by a first switch, a main body assembly capable of controlling the legs assemblies to rotate 180° around a shaft by a second switch, a central shaft assembly supporting a tripod head or a camera, and a tripod head assembly assembled with the tripod; the tripod is provided with legs being rapidly assembled; and the assembly and refraction of the legs are controlled by a simple-to-operate switch. The tripod can be inversely folded by 180° under the control of the switch, thus reducing the length of the tripod. When the tripod is positioned non-horizontally due to the factor of environment, an adjustable tripod head sphere can stay level during turning, so that the camera installed on the turntable is ensured to be horizontal and can rotate 360° horizontally via operating a locking device.

6 Claims, 9 Drawing Sheets

(51) Int. Cl.
  *F16M 11/16* (2006.01)
  *F16M 11/32* (2006.01)
  *F16M 11/26* (2006.01)
  *F16M 11/08* (2006.01)
  *F16M 11/20* (2006.01)
  *F16M 11/38* (2006.01)
  *F16B 7/10* (2006.01)

(52) U.S. Cl.
  CPC .......... *F16M 11/16* (2013.01); *F16M 11/2078* (2013.01); *F16M 11/26* (2013.01); *F16M 11/32* (2013.01); *F16B 7/105* (2013.01); *F16M 11/38* (2013.01)

(56) References Cited

U.S. PATENT DOCUMENTS

| | | | |
|---|---|---|---|
| 6,536,723 B1* | 3/2003 | Nakatani | 248/163.1 |
| 6,719,257 B1 | 4/2004 | Greene et al. | |
| 6,761,501 B1* | 7/2004 | Nakatani | 403/109.5 |
| 7,000,875 B2* | 2/2006 | Pernstich et al. | 248/168 |
| 7,048,241 B2* | 5/2006 | Crain et al. | 248/170 |
| 7,077,582 B2* | 7/2006 | Johnson | 396/428 |
| 7,178,767 B2 | 2/2007 | Steyn et al. | |
| 7,229,053 B2* | 6/2007 | Speggiorin | 248/163.1 |
| 7,658,556 B2* | 2/2010 | Johnson | 396/428 |
| 7,988,108 B2* | 8/2011 | Zen et al. | 248/177.1 |
| 8,485,488 B2* | 7/2013 | Forrest et al. | 248/408 |
| 8,596,892 B2* | 12/2013 | Murrow et al. | 396/428 |
| 8,628,258 B2* | 1/2014 | Vogt | 396/428 |
| 8,757,564 B2* | 6/2014 | Huang | 248/184.1 |
| 9,004,419 B2* | 4/2015 | Nakatani | 248/178.1 |
| 2003/0234327 A1 | 12/2003 | Nakatani | |
| 2006/0175484 A1* | 8/2006 | Wood et al. | 248/177.1 |
| 2007/0084979 A1* | 4/2007 | Hofner et al. | 248/177.1 |
| 2008/0224000 A1* | 9/2008 | Yang | 248/188.5 |
| 2009/0250567 A1* | 10/2009 | Raynaud | 248/168 |
| 2010/0019109 A1* | 1/2010 | Liu | 248/168 |
| 2011/0073722 A1* | 3/2011 | Meuret et al. | 248/169 |
| 2011/0133043 A1* | 6/2011 | Chang | 248/188.9 |
| 2011/0260016 A1* | 10/2011 | Johnson et al. | 248/168 |
| 2012/0018597 A1* | 1/2012 | Cyr | 248/165 |
| 2012/0174318 A1* | 7/2012 | Vestergaard | 5/613 |
| 2012/0205510 A1* | 8/2012 | Fortier | 248/423 |
| 2013/0026315 A1* | 1/2013 | Lee | 248/168 |
| 2013/0134268 A1* | 5/2013 | Wessells et al. | 248/125.8 |

FOREIGN PATENT DOCUMENTS

| | | |
|---|---|---|
| CN | 201731245 U | 2/2011 |
| JP | 2008082460 A | 4/2008 |

* cited by examiner

INVERSELY FOLDABLE CAMERA TRIPOD BEING RAPIDLY ASSEMBLED

CROSS-REFERENCE TO RELATED APPLICATIONS

This application claims priority to PCT Application No. PCT/CN2012/079027, having a filing date of Jul. 23, 2012, based off of CN 201210111928.8 having a filing date of Apr. 16, 2012, the entire contents of which are hereby incorporated by reference.

FIELD OF TECHNOLOGY

The present invention relates to a tripod for camera, in particular an inversely foldable tripod being rapidly assembled, which belongs to the technical field as to photography and photographic equipment.

BACKGROUND

Camera, especially digital camera is very popular to be used in recording memories, people can record their memories or any interesting matter conveniently by using camera. During photography, the camera should be fixed onto a tripod in order to ensure the quality of the pictures or the films. Among the existing tripod products, the smallest tripod is still not portable enough even after being folded, and a desktop tripod is not tall enough to be adapted to outdoor applications. Thus, most of users do not use a tripod when using a small camera.

At present, most legs of traditional tripods are locked using screw lock type or snap lock type devices, which is difficult to operate. In the meantime, the tripod has a relative long length even after folding, which is inconveniently portable. In the Chinese patent ZL 200910145693.2, the leg is locked in the form of friction, which is convenient to assemble, but it is not applicable to minitype digital cameras.

SUMMARY

The following provides an inversely foldable camera tripod being rapidly assembled, in order to overcome the disadvantages mentioned above. It makes the tripod rapidly assembled and easy to operate. Further, the camera tripod can be folded inversely, to reduce its length when folding, and makes the tripod easier to transport.

An advantage can be achieved by the following solution. An inversely foldable camera tripod being rapidly assembled according to the embodiments of the invention comprises legs assemblies being rapidly stretchable or assembled, a main body assembly enabling the legs to rotate 180° about a shaft, a central shaft assembly supporting a tripod head or a camera, and a tripod head assembly assembled with the tripod. Said legs assemblies comprise a plurality of tubes and locking means for connecting any adjacent tubes, wherein two adjacent tubes can be connected to each other, and their diameters are gradually reduced. Said main body assembly comprises a main body, legs connectors that can be rotated 180° about a shaft and connect to the legs, and an inhibiting device that can restrict the rotation of the legs.

Said plurality of tubes in the inversely foldable camera tripod according to the embodiments of the invention, comprise a first tube, a second tube, a third tube, a forth tube, a fifth tube and a sixth tube. Inhibiting holes are configured at the adjacent tubes, and inhibiting units are configured in a connecting means between the adjacent tubes, the inhibiting units will be embedded into both holes in adjacent tubes automatically when the both holes have come into line.

Said second tube in the inversely foldable camera tripod according to the embodiments of the invention, comprises a retainer having a slot, and a spring ring installed in the slot. Two holes are respectively configured at the bottom end of first tube and the top end of second tube, for positioning stirred bead, outer end of the stirred bead is equipped with a spring, and is covered by a tube lid and a tube rear lid that can inhibit the circular motion of the first and second tubes, wherein the stirred bead and the spring are placed within the tube lid. The locking means used to connect fifth and sixth tubes is also provided with a first switch controlling the stretch of the whole legs, a spring and a spring pocket, in which the spring pocket is mounted in the sixth tube, and moved in conformity with the movement of the sixth tube.

Said inhibiting device of the main body in the inversely foldable camera tripod according to the embodiments of the invention, comprises a mounting tooth mounted on the main body, guiding clamping blocks, a guiding tooth, a second switch, a spring that all mounted in legs connectors, and a shaft, an inlay, bolts that used to connect the main body to the legs connectors.

Said mounting tooth in the inversely foldable camera tripod according to the embodiments of the invention, is mounted on the main body, each mounting tooth has two inhibiting teeth, which correspond to the guiding tooth mounted in the legs connectors, the spring is connected to the lower end of the guiding tooth; the middle of the guiding tooth is provided with a slot having an inclined wall, the second switch is mounted in the slot; said guiding tooth is provided with an inclined surface, and also have an inclined surface corresponding to the inclined wall.

Said central shaft assembly in the inversely foldable camera tripod according to the embodiments of the invention, comprises a plurality of tubes, connections that connect the adjacent tubes, a tray supporting the tripod head or the camera, and bolts.

Said tripod head assembly in the inversely foldable camera tripod according to the embodiments of the invention, comprises a turntable, a sphere, left and right clamping blocks, a swivel mount, a means for locking the turntable and a means for locking the sphere; the means for locking the turntable may solely adjust the tightness of the turntable without affecting the rotation of the sphere; the means for locking the sphere may solely adjust the tightness of the sphere without affecting the rotation of the turntable.

By the above mentioned solution, the inversely foldable camera tripod being rapidly stretchable according to the embodiments of the invention has advantages as follow:

1. The legs can be rapidly stretched out easily as the control of the stretch is achieved by the first switch.
2. The tripod can be folded 180° inversely, reducing the length of the folded tripod, and the control of the folding is achieved by the second switch.
3. When the tripod is positioned non-horizontally due to the factor of environment, the turntable could be maintained horizontally by adjusting the sphere on the tripod head, to ensure the camera mounting horizontally on the turntable. Moreover, the camera can rotate 360° horizontally by operating the means for locking the turntable.

BRIEF DESCRIPTION

LIST OF REFERENCE CHARACTERS

Figure 1:
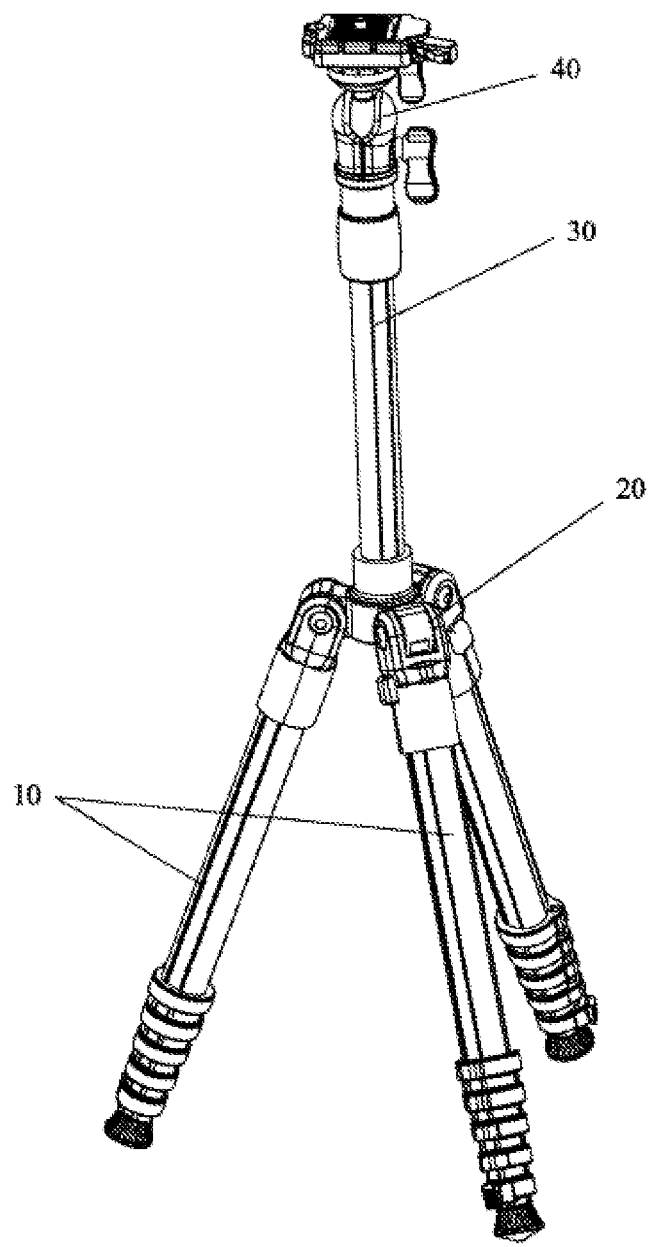
FIG. 1 is a schematic drawing according an embodiment of the present invention when the tripod is in open condition.
Figures 2A, 2B:
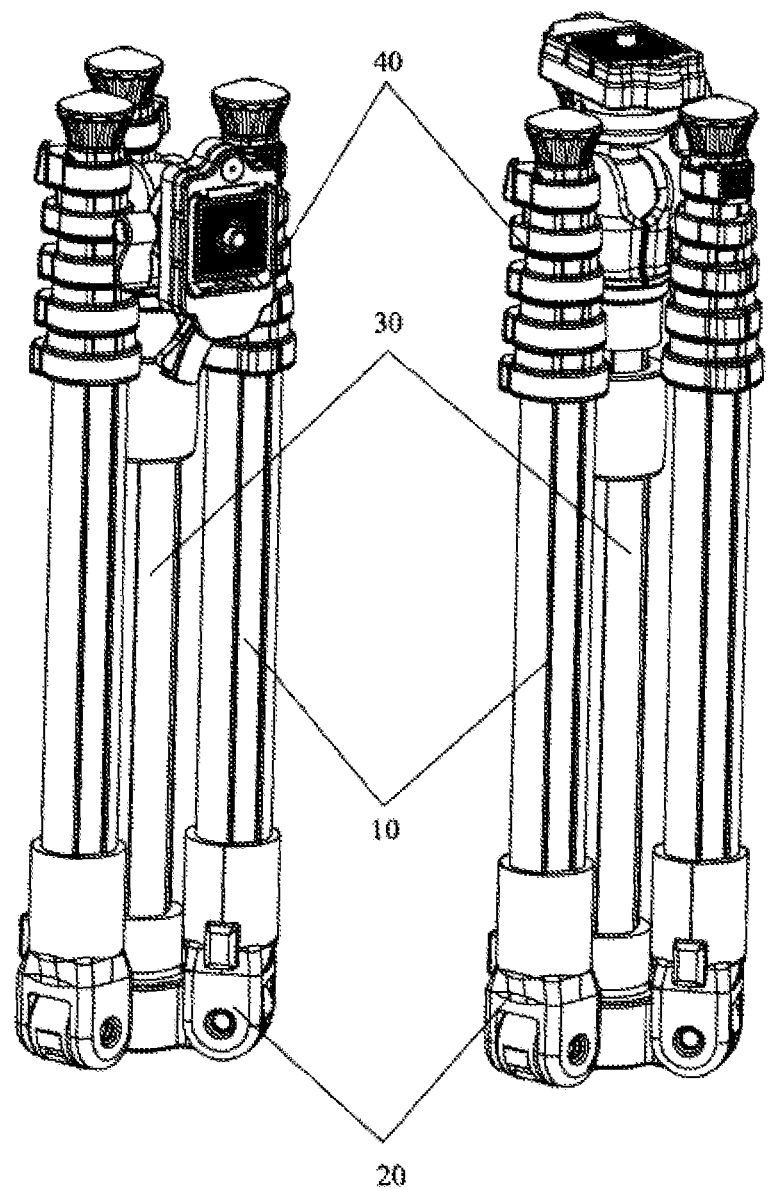
FIGS. 2a and 2b are schematic drawings in the different structures an embodiment of the present invention when the tripod is in folded condition.

10—legs assemblies
11—first tube
111—tube lid
112—tube rear lid
12—second tube
121—retainer
122—spring ring
13—third tube
14—forth tube
15—fifth tube
16—sixth tube
17—locking means
171—stirred bead
172—spring
17'—locking means
171'—spring pocket
172'—spring
173'—stirred bead
174'—first switch
20—main body assembly
21—main body
22—inhibiting device
222—mounting tooth
223, 223'—guiding clamping block
224—guiding tooth
225—second switch
226—spring
227—shaft
228—inlay
229—bolt
23—legs connectors
30—central shaft assembly
31—a plurality of tubes
32—connectors that connect the adjacent tubes
33—tray
34—bolt
40—tripod head assembly
41—turntable
411—horizontal bead
42—sphere
43, 43'—left clamping block, right clamping block
44—swivel mount
45—means for locking the turntable
46—means for locking the sphere
461—first locking housing
462—second locking housing
463—locking lid
464—locking handle

DETAILED DESCRIPTION

A preferable embodiment of the present invention will be further described in detail hereinafter with reference to accompanying drawings, whereby the desired object of the invention can be achieved.

As shown in FIGS. 1, 2, 3, 8 and 9, the an embodiment of invention provides an inversely foldable tripod being rapidly stretchable, comprising legs assemblies 10 that can be rapidly stretchable or assembled, a main body assembly 20 enabling the legs to rotate an angle of 180° about its shaft, a central shaft assembly 30 supporting a tripod head or a camera, and a tripod head assembly 40 assembled with the tripod.

Each leg assembly 10 comprises a plurality of tubes, wherein two adjacent tubes can be connected to each other, and their diameters are gradually reduced. In this embodiment, the plurality of tubes comprise a first tube 11, a second tube 12, a third tube 13, a forth tube 14, a fifth tube 15, a sixth tube 16 and locking means 17, 17' for connecting two adjacent tubes, wherein the first tube 11 is connected to the second tube 12, and the diameter of second tube 12 is smaller than the diameter of first tube 11; the second tube 12 is connected to the third tube 13, and the diameter of third tube 13 is smaller than the diameter of second tube 12; and so on.

Figure 4A:
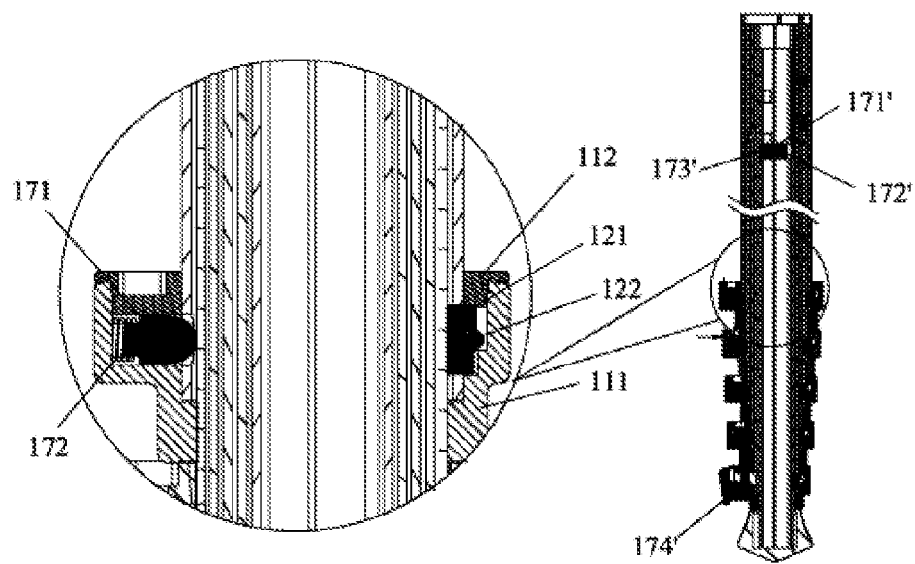
FIG. 4a is a cross-section view of the legs according to the an embodiment of present invention when the leg is in folded condition.

As shown in FIG. 4a, the second tube 12 comprises a retainer 121 having a slot, and a spring ring 122 having an opening installed in the slot. Holes for positioning stirred bead 171 are respectively configured at the bottom end of first tube 11 and the top end of second tube 12, outer end of the stirred bead 171 is equipped with a spring 172, and is covered by a tube lid 111 and a tube rear lid 112 that inhibit the circular motion of the first and second tubes 11, 12, wherein the stirred bead 171 and the spring 172 are placed within the tube lid 111.

The locking means 17' used to connect fifth tube 15 and sixth tube 16 is also provided with a first switch 174' controlling the stretch of the whole leg, a spring 172' and a spring pocket 171', in which the spring pocket 171' is mounted in the sixth tube 16, and moved in conformity with the movement of the sixth tube 16.

As shown in FIGS. 5a, 5b, 5c, 6a and 6b, each main body assembly 20 comprises a main body 21, an inhibiting device 22 that can restrict the rotation of the leg, and a leg connector 23 that can rotate about a shaft 227 in the range of 180° and connect to the leg. The inhibiting device 22 comprises mounting tooth 222 mounted on the main body 21, guiding clamping blocks 223, 223', a guiding tooth 224, a second switch 225, a spring 226 that all mounted in legs connectors 23, and a shaft 227, an inlay 228 and bolt 229 that used to connect the main body 21 to the legs connectors 23.

Figure 4B:
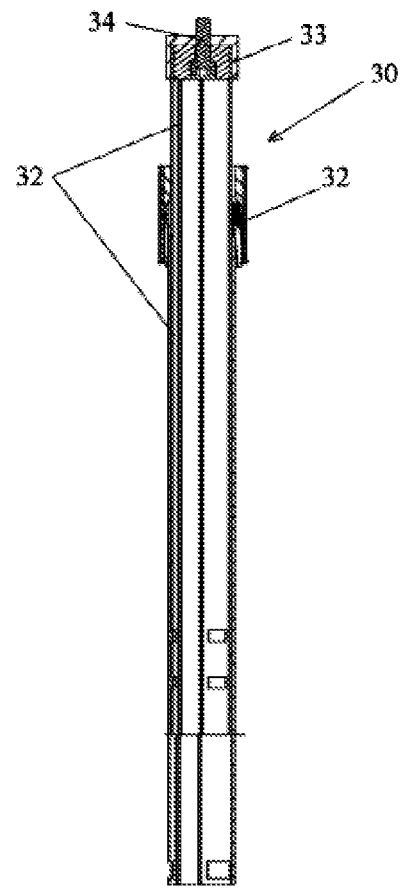
FIG. 4b is a cross-section view of the central shaft assembly according to an embodiment of the present invention.
Figure 5A:
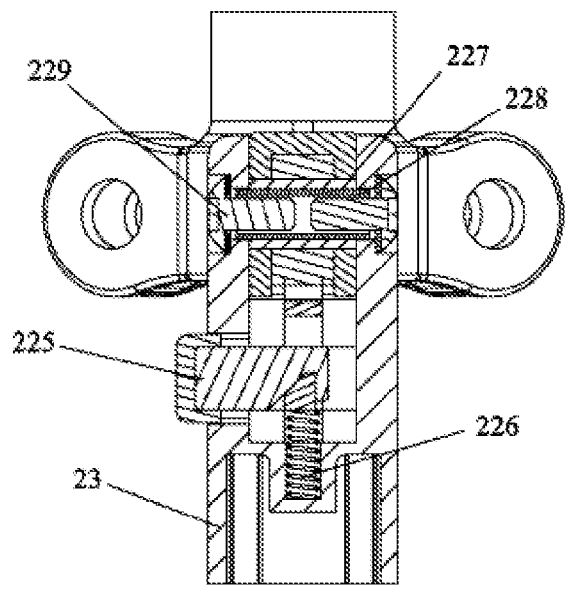
FIG. 5a is a cross-section view of the main body assembly according to an embodiment of the present invention.
Figure 5B:
FIG. 5b is a schematic drawing of the second switch in the main body assembly according to an embodiment of the present invention.
Figure 5C:
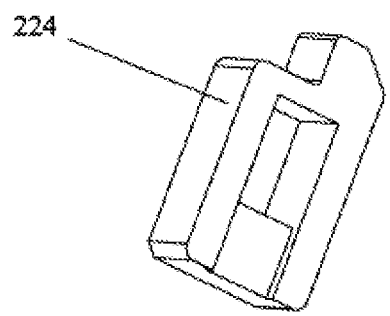
FIG. 5c is a schematic drawing of the guiding tooth in the main body assembly according to an embodiment of the present invention.

As shown in FIG. 4b, the central shaft assembly 30 comprises a plurality of tubes 31, connectors 32 that connect the adjacent tubes, a tray 33 supporting the tripod head or the camera, and bolts 34.

Figure 7:
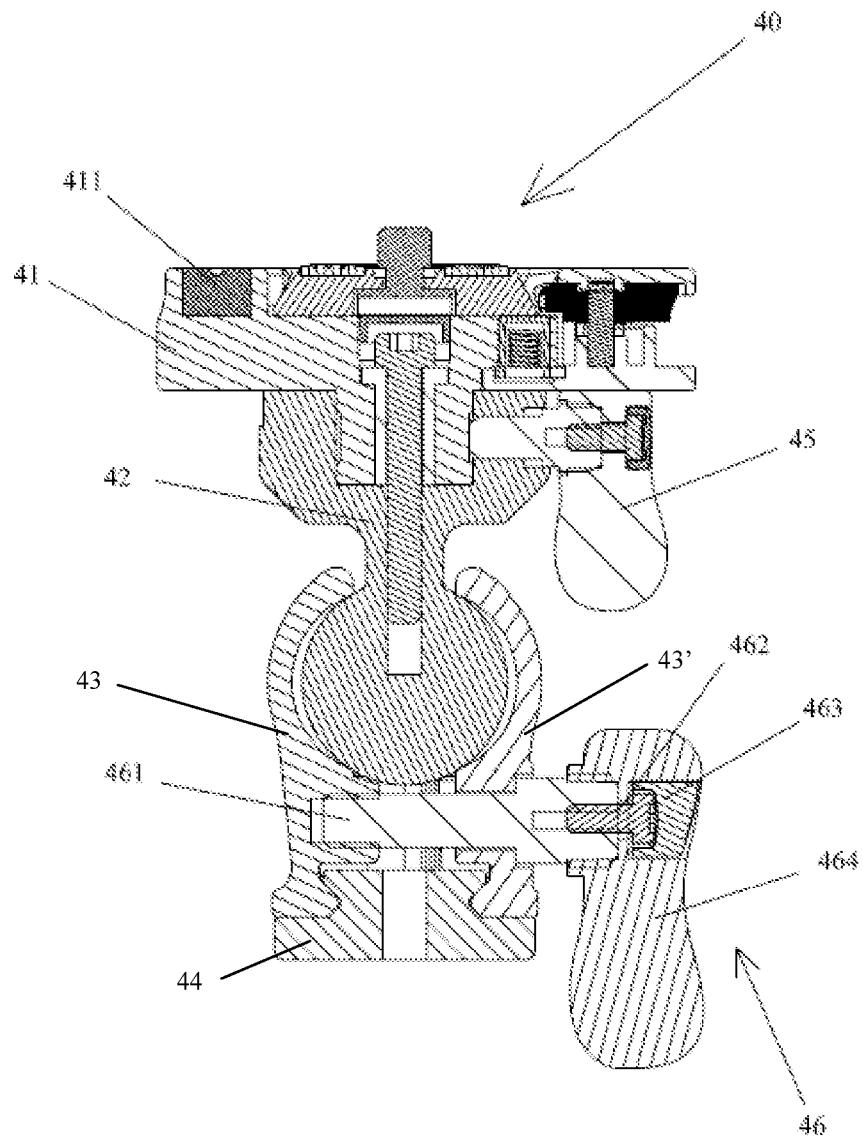
FIG. 7 is a schematic drawing of the tripod head assembly according to an embodiment of the present invention.
Figure 8:
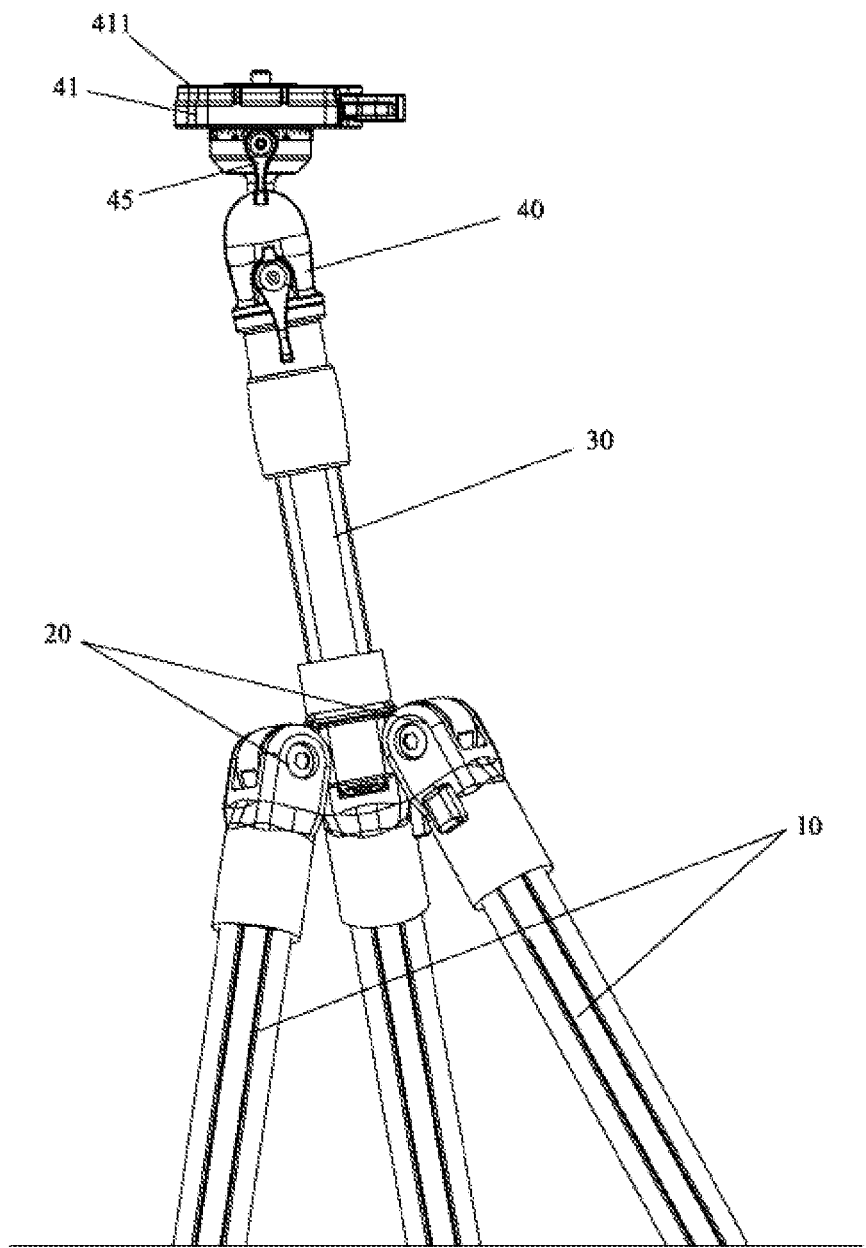
FIG. 8 is a schematic drawing of an embodiment of the present invention when adjusting the tripod head to a horizontal position, while the tripod is positioned non-horizontally.
Figure 9:
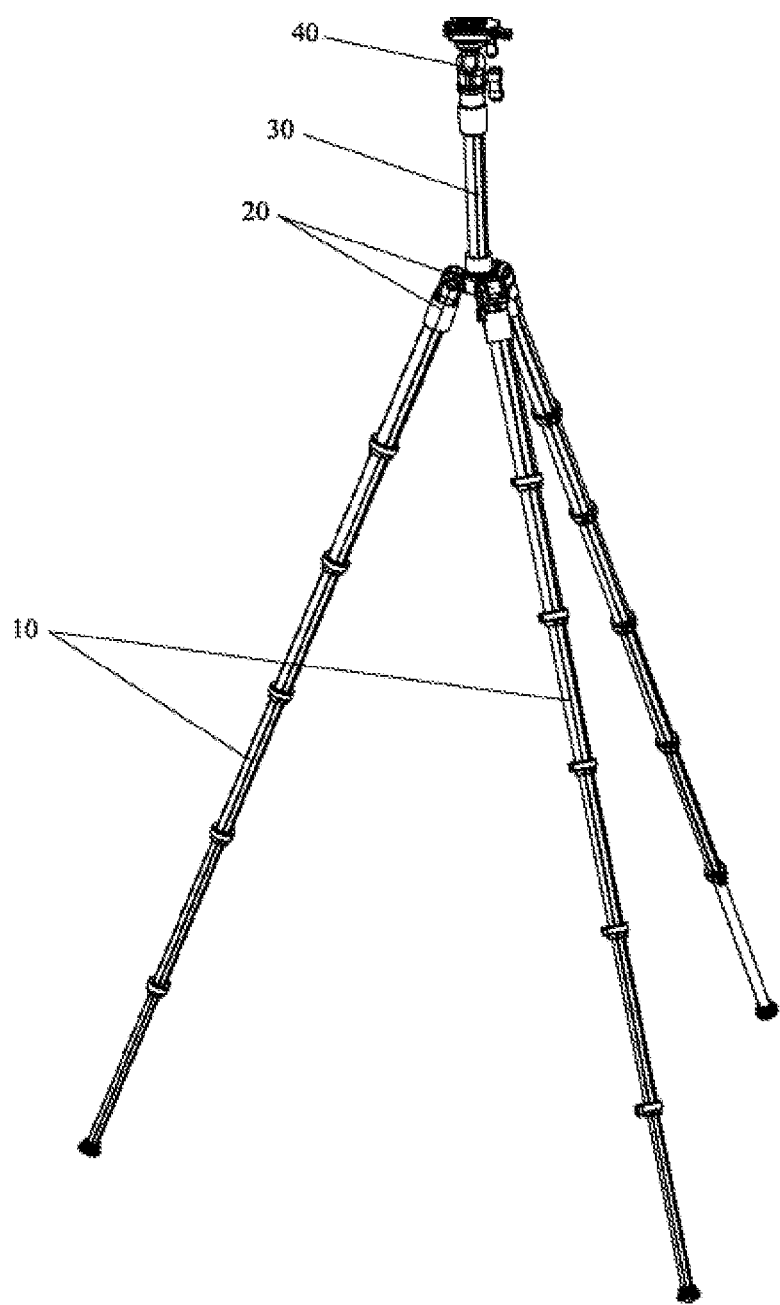
FIG. 9 is a schematic drawing of an embodiment of the present invention when the tripod is in an open condition.

As shown in FIG. 7, the tripod head assembly 40 comprises a turntable 41, a sphere 42, the left and right clamping blocks 43, 43', a swivel mount 44, a means 45 for locking the turntable and a means 46 for locking the sphere; the means 45 for locking the turntable may solely adjust the tightness of the turntable 41 without affecting the rotation of the sphere 42; the means 46 for locking the sphere may solely adjust the tightness of the sphere 42 without affecting the rotation of the turntable 41. The means 46 for locking the sphere comprises a first locking housing 461, a second locking housing 462, a locking lid 463 and a locking handle 464.

Figure 3:
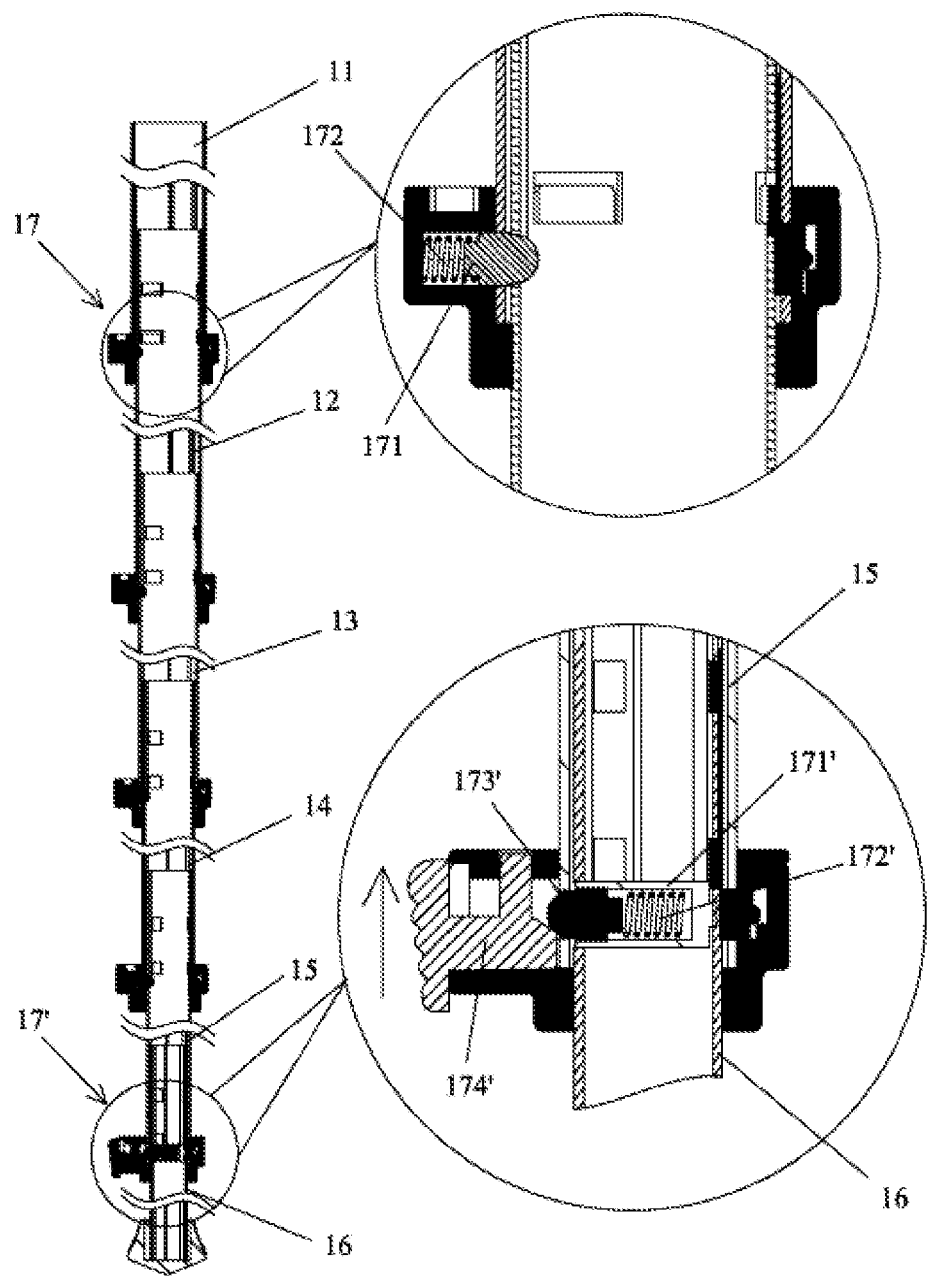
FIG. 3 is a cross-section view of the legs according to an embodiment of the present invention when the leg is in open condition.

As shown in FIGS. 3, 4a and 4b, two holes are respectively configured at the bottom end of first tube 11 and the top end of second tube 12, when the leg is stretched out, the stirred bead 171 is embedded in the holes in first tube 11 and second tube 12 under the force generated by the spring 172. Inner end of the stirred bead 171 is spherical while outer end thereof is cylindrical, so that the cylindrical portion inhibits the vertical movement of first tube 11 and second tube 12. The same connection is applied to the other adjacent tubes.

On the last tube, i.e. sixth tube 16, there is a through-hole, in which the spring pocket 171' is embedded, and the spring pocket 171' is provided with the spring 172' and the stirred bead 173'. When the leg is in the stretch condition, the stirred bead 173' is embedded in the holes in fifth tube 15 and sixth tube 16 under the force generated by the spring 172', so that the whole leg is in locking condition. On the contrary, pushing up the first switch 174', since the first switch 174' is provided with an inclined surface, so that the first switch 174' can press the stirred bead 173' into the spring pocket 171', and thereby the locking condition of the sixth tube 16 is released, and the sixth tube 16 may retract into fifth tube 15. When the sixth tube 16 retracted, the top end thereof presses the stirred beads 173' placed between fourth and fifth tubes outwards, then the spring 172' is under compression, and the locking condition between fourth tube 14 and fifth tube 15 is released, so that the fifth tube 15 may retract into the fourth tube 14. All tubes can retract in such a manner to obtain the condition as shown in FIG. 3. Therefore, only the first switch 174' can control the stretch and retraction of the legs. In addition, the height of the tripod can be adjusted by drawing out the tubes from bottom to top in sequence without the retraction condition of sixth tube.

Figure 6A:
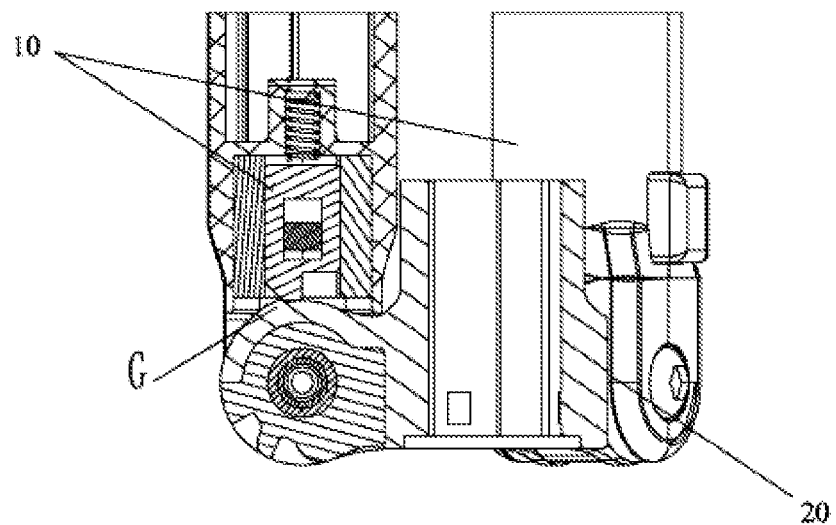
FIGS. 6a and 6b are schematic drawings of the legs according to an embodiment of the present invention when the legs rotate in a certain angle, and 180°.
Figure 6B:
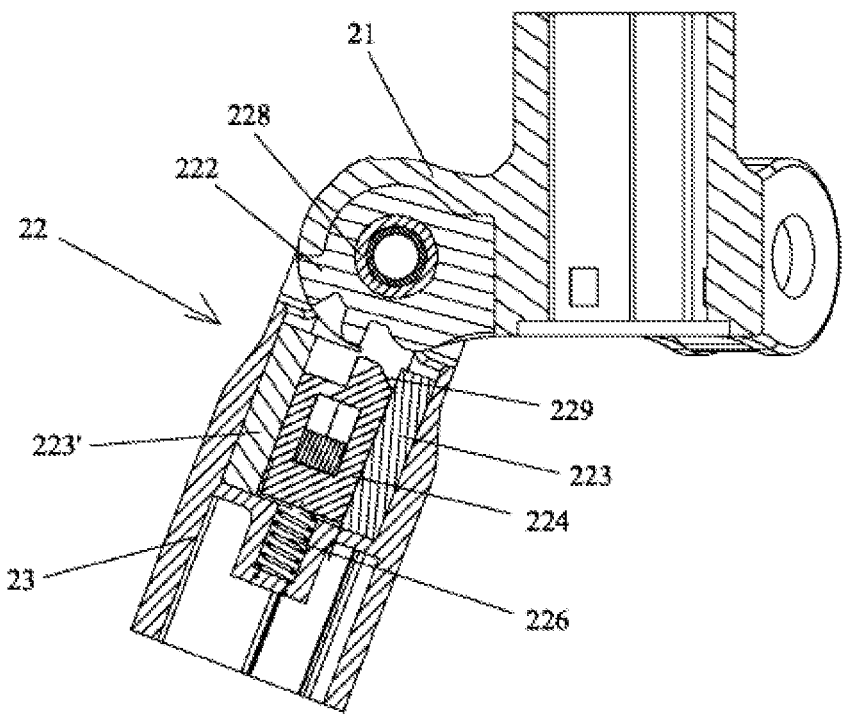

As shown in FIGS. 5a, 5b, 5c and 6b, the mounting tooth 222 is mounted on the main body 21, the mounting tooth 222 has two inhibiting teeth, which correspond to the guiding tooth 224 mounted in the leg connector 23, the spring 226 is connected to the lower end of the guiding tooth 224. The middle of the guiding tooth 224 is provided with a slot having an inclined wall, the second switch 225 is mounted in the slot, and has an inclined surface corresponding to the inclined wall. When pushing the second switch 225 inwards, the guiding tooth 224 moves downwards to compress the spring 226, the guiding tooth disengages with the mounting tooth, so that the leg connector 23 together with the legs can rotates 180° about the shaft as shown in FIG. 6b. When the desired inhibiting condition is achieved, the release of the second switch 225 may enable the guiding tooth 224 to spring back automatically, and the guiding tooth 224, together with the mounting tooth 222 will be in the inhibiting condition, whereby the one-switch operation is achieved; Further an inhibiting device is also configured at G point in the main body 21, so that the tripod is stable when it is in inversely folded condition as shown in FIG. 6a.

As shown in FIG. 7, the means 46 for locking the sphere controls the locking of the sphere 42, the upper end of the sphere is connected to the turntable 41. The means 45 for locking the turntable controls the locking of the turntable. When the tripod is positioned non-horizontally due to the factor of environment, it only needs to adjust the turntable 41 into the horizontal condition according to the horizontal bead 411, without adjusting the legs of the tripod, whereby the camera on the turntable 41 can be in horizontal condition. In addition, the camera may rotate within the range of 360° horizontally by loosening the means 45 for locking the turntable.

The embodiment described hereinbefore is merely a preferred embodiment of the present invention and not for purposes of any restrictions or limitations on the invention. It will be apparent that any non-substantive, obvious alterations or improvement by the technician of this technical field according to the present invention may be incorporated into ambit of claims of the present invention.

The claims are as follows:

1. An inversely foldable camera tripod being rapidly assembled, comprising:
   a plurality of leg assemblies being rapidly assembled and retracted by a first switch;
   a main body assembly enabling the plurality of leg assemblies to rotate in a range of 180° angle about a shaft by a second switch;
   a central shaft assembly for supporting a tripod head for use with a camera; and
   a tripod head assembly assembled with said tripod;
   wherein said plurality of leg assemblies comprise a plurality of tubes and a locking means for connecting a plurality of adjacent tubes, wherein two a plurality of adjacent tubes can be connected to each other;
   wherein said main body assembly comprises a main body, a plurality of leg connectors that can rotate in the range of 180° about the shaft and connect to the plurality of leg assemblies, and an inhibiting device associated with each leg connector that can restrict a rotation of the plurality of leg assemblies;
   wherein said plurality of tubes comprise a first tube, a second tube, a third tube, a fourth tube, a fifth tube and a sixth tube;
   wherein two inhibiting holes are configured at the two of the plurality of adjacent tubes, respectively, and inhibiting units are configured in a connecting means between the two of the plurality of adjacent tubes, the inhibiting units being embedded into both of the two inhibiting holes in two of the plurality of adjacent tubes automatically when the two inhibiting holes come into line;
   wherein said second tube comprises a retainer having a first slot, and a spring ring is installed in the first slot;
   wherein the two inhibiting holes are respectively configured at a bottom end of the first tube and a top end of the second tube, for positioning stirred bead, an outer end of the stirred bead is equipped with a first spring, and is covered by a tube lid and a tube rear lid that can inhibit a circular motion of the first tube and the second tube, wherein the stirred bead and the spring are placed within the tube lid;
   wherein the locking means used to connect the fifth tube and the sixth tube is also provided with the first switch controlling a stretch of each leg assembly, a second spring and a spring pocket, in which the spring pocket is mounted in the sixth tube, and moved in conformity with a movement of the sixth tube.

2. The tripod of claim 1, wherein each said inhibiting device of the main body comprises a mounting tooth mounted on the main body, and also guiding clamping blocks, a guiding tooth, the second switch, a third spring that are all mounted in the plurality of leg connectors, and a shaft, an inlay, bolts that used to connect the main body to the plurality of leg connectors.

3. The tripod of claim 2, wherein said mounting tooth is mounted on the main body, each mounting tooth has two inhibiting teeth, which correspond to the guiding tooth mounted in the plurality of leg connectors, the third spring is connected to a lower end of the guiding tooth; a middle of the guiding tooth is provided with a second slot having an inclined wall, the second switch is mounted in the second slot; said guiding tooth is provided with an inclined surface, and also have an inclined surface corresponding to the inclined wall.

4. The tripod of claim 1, wherein said central shaft assembly comprises a plurality of tubes, connections that connect the plurality of adjacent tubes, a tray supporting the tripod head or the camera, and bolts.

5. The tripod of claim 1, wherein said tripod head assembly comprises a turntable, a sphere, left and right clamping blocks, a swivel mount, a means for locking the turntable and a means for locking the sphere.

6. The tripod of claim 5, wherein said means for locking the sphere comprises a first locking housing, a second locking housing, a locking lid and a locking handle.

* * * * *